3,044,995
SULFONE SALTS AND POLYAMIDES
Donald M. Young, Geneva, Switzerland, and Christian F. Horn, Charleston, W. Va., assignors to Union Carbide Corporation, a corporation of New York
No Drawing. Filed June 24, 1959, Ser. No. 822,428
29 Claims. (Cl. 260—78)

The present invention relates to novel sulfone salts and polyamides and to shaped articles such as filaments, films and molded products.

This application is a continuation-in-part of our earlier application Serial No. 688,413, filed October 7, 1957, now abandoned.

In accordance with the invention, it has been found that sulfone polyamides having recurring structural units of the general formula (I) 

wherein R is a divalent, unsubstituted polymethylene chain containing from three to six carbon atoms, R' is a divalent, saturated straight or branched chain alkylene group containing from three to twelve carbon atoms, at least three carbon atoms being in the chain separating adjacent sulfonyl groups, and R" is a divalent saturated alkylene, alkylene ether or aralkylene group can be prepared by reaction of alpha,omega diamines with alkylene disulfones of the general formula (II)     R'[SO$_2$RCOOX]$_2$ in which the R's and R' are as defined in Formula I and the X's are H or lower alkyl radicals capable of forming an alcohol that has a boiling point below about 200° C., and that monomeric sulfone salts, valuable as intermediate materials in the preparation of polyamides, can be prepared from said diamines and alkylene disulfonyl dicarboxylic acids represented by Formula II when the X's are hydrogen.

The sulfone polyamides of the invention, and shaped articles thereof, have a considerable number of important advantages. They are highly crystalline, fiber-forming linear polyamides having melting points within the range of about 190 to over 250° C., a high degree of chemical stability and insolubility in water, dilute inorganic and organic acids, alkalies and most organic solvents. They are capable of absorbing coloring materials and are therefore readily dyed. They possess good dielectric properties and moisture regain and are bright, tough resins that can readily be formed into fibers, films, and other shaped articles. Fibers and films made therefrom have, upon being cold-stretched, excellent strength, resiliency and pliability.

The sulfone salts of the invention are susceptible to easy purification by recrystallization from aqueous alcohol, have favorable melting points in the range of about 180 to 200° C., and are stable until heated for polycondensation.

The minimum number of carbon atoms in the groups R and R' of the disulfone dicarboxylic acids and esters thereof represented by Formula II is critical in that less than three carbon atoms in the chains of groups R and R' would result in high melting points and excessive decomposition of product during polycondensation with alpha,omega diamines due to thermo-instability of α- and β-disulfones at elevated temperatures. The maxima of six and twelve carbon atoms in groups R and R', respectively, are also critical in that greater numbers of carbon atoms in these groups would result in the preparation of polyamides having melting points that are too low to have practical utility in film or fiber formation. For optimum results, the divalent R' group should contain at least six carbon atoms when R is trimethylene, at least five carbon atoms when R is tetramethylene and at least four carbon atoms if R is pentamethylene.

Disulfone dicarboxylic acids that are particularly preferred as starting materials for the polyamides include 6,6'-(tetramethylenedisulfonyl)dicaproic acid, 6,6'-(pentamethylenedisulfonyl)dicaproic acid, 6,6'-(hexamethylenedisulfonyl)dicaproic acid, 6,6' - (decamethylenedisulfonyl)dicaproic acid, 6,6'-(methylpentamethylenedisulfonyl)dicaproic acid, 6,6'-(2-,2-dimethyltrimethylenedisulfonyl)dicaproic acid, 5,5'-(octamethylenedisulfonyl)divaleric acid and 4,4'-(decamethylenedisulfonyl)dibutyric acid.

The disulfone dicarboxylic acids can be prepared in several ways, as described for example in U.S. Patent 2,969,387. One method of preparation that has been found suitable involves heating under reflux an alkylene dichloride, R'Cl$_2$, in which R' is as defined with reference to Formula I, with a salt of a mercapto carboxylic acid, HSRCOOH, in which R is as defined with reference to Formula I, prepared by reacting the acid with sodium hydroxide in the presence of aqueous ethanol, to form the corresponding dithio dicarboxylic acid and oxidizing the acid thus formed to the corresponding disulfonyl dicarboxylic acid by adding to the dithio dicarboxylic acid, while dissolved in aqueous sodium hydroxide, peracetic acid or other suitable oxidizing agent. If a diester is desired, the disulfonyl dicarboxylic acid can be esterified with the appropriate alcohol. An entire sequence of reaction for forming a disulfonyl dicarboxylic acid and then esterifying it to the corresponding dimethyl ester is illustrated as follows:

(III) (A)    R'Cl$_2$ + NaSRCOONa

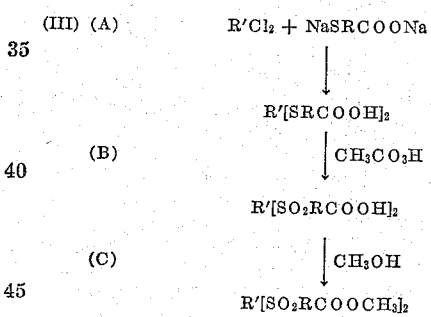

(B)    R'[SRCOOH]$_2$

| CH$_3$CO$_3$H

(C)    R'[SO$_2$RCOOH]$_2$

| CH$_3$OH

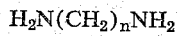

R'[SO$_2$RCOOCH$_3$]$_2$

The alpha,omega diamines that are particularly suitable as starting materials in accordance with the invention include, as indicated in the definition of R" in Formula I, compounds of the general formula (IV)     R"(NH$_2$)$_2$ in which R" is a divalent saturated alkylene, alkylene ether or aralkylene radical containing from two to eighteen carbon atoms. Preferred among these are the alpha,omega polymethylene diamines of the formula H$_2$N(CH$_2$)$_n$NH$_2$ in which n is an integer from 2 to 10, branched chain alkylene diamines, alkylene ether diamines of the formula H$_2$N(CH$_2$)$_m$O(CH$_2$)$_{m'}$O(CH$_2$)$_m$NH$_2$ in which the m's are integers from 2 to 6 and m' is an integer from 3 to 6, and meta- or para-xylylene diamine.

The reaction of the primary starting materials in forming sulfonyl polyamides is believed to take place in several stages. While there is reason to believe that these stages are not necessarily separate and distinct and that they may at least in part take place simultaneously, the mechanism of the reactions involved in preparing salts and polyamides from disulfone dicarboxylic acids and alpha,omega diamines is, by way of example, set forth immediately below:

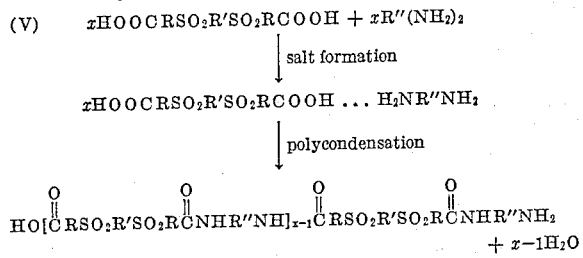

It will be evident that if the corresponding dialkyl esters of the disulfones are used instead of the acids, an alcohol corresponding to the alkyl radicals, i.e., methanol if the dimethyl ester is used, will distill out rather than water of condensation.

The initial reactants are admixed in stoichiometric proportions as indicated in Equation V. The polycondensation is carried out at elevated temperatures preferably about 10 to 30° C. above the melting point of the final resin. While some operable sulfone monomers begin to degrade when heated above 250° C., as shown by slow discoloration, the polycondensations generally can be conducted at temperatures of the order of about 180 to 300° C. and preferably between 200 and 280° C., somewhat lower temperatures however being advisable when less thermostable sulfone monomers or resins are involved.

The polycondensation can be carried out by heating the monomers, i.e., the acid and diamine, directly to the temperatures described. It is frequently desirable, however, first to convert the monomers into the corresponding salt as indicated in the first part of Reaction V and then subjecting the salt to the heat treatment. The advantage of this method is that the salts can readily be recrystallized from aqeuous alcohol for purification, whereas in many instances purification of the free acid would be difficult.

The polycondensation or melt-polymerization should be carried out under an inert atmosphere such as nitrogen and may proceed at atmospheric, reduced or superatmospheric pressure. If the diamine used as one of the initial reactants is fairly volatile, it is desirable to conduct at least the first phase of the polymerization under superatmospheric pressure to avoid the escape of any diamine. After the formation of a low molecular weight polymer, the polycondensation can then be continued under atmospheric pressure. If the melting point of the final resin is so high as to bring about thermal decomposition, the polycondensation can be performed in an inert solvent such as meta-cresol, paraffin oil or other inert liquid.

The polycondensation is terminated when the resin has reached a preselected molecular weight. When the polymerization is carried out in solution the polyamide may either begin to precipitate after reaching a certain molecular weight or, if it is more soluble in the solvent, it can be precipitated by addition of a non-solvent to the solution. After complete removal of the liquids, the precipitated polyamide, in powder form, can be melt-extruded into filaments, films or articles of desired shape.

The ultimate use for which the polyamide is intended will in large part determine the polycondensation procedure and therefore the molecular weight or degree of polymerization of the polyamide. High tenacity films and continuous filaments require relatively high molecular weight polyamides whereas molding powders can generally have lower molecular weights. Generally speaking, however, the most useful molecular weights are those in which the reduced viscosity of the resin is between about 0.4 and 2.5, the reduced viscosity being defined as:

$$(VI) \quad I_R = \frac{\left(\frac{\Delta N}{N_0}\right)}{C}$$

in which $\Delta N$ is the difference between flow time of solution and flow time of solvent, $N_0$ stands for flow time of solvent and $C$ is the concentration of the polyamide in grams per 100 cc. of solution, a 3:2 mixture of phenol and tetrachloroethane being used as solvent, the measurements being performed at 30° C. with a concentration of 0.2 gram polyamide per 100 cc. of solution.

It is also possible, depending upon the desired physical properties of the polyamides and their intended use, to form copolymers of various combinations of disulfone diacids or the esters thereof with alpha,omega diamines. Thus, for example, two or more disulfone diacids can be copolymerized with one or more diamines to yield polyamide resins having generally less crystalliinity, lower melting points, softer appearance and better solubility. Copolyamides of similar properties can also be prepared by copolymerization of one or more diamines with one or more disulfone dicarboxylic acids and dicarboxylic acids having no sulfone groups, such as oxalic acid, adipic acid, azelaic acid, terephthalic acid, and the like. It is also within the scope of the invention to modify the polyamides by introduction, at any appropriate time during the polycondensation, of preselected amounts of viscosity stabilizers, pigments or other additives which do not interfere with the polymerization.

The method, products and the utility and advantages thereof will become further apparent from the following detailed examples included to illustrate the best modes now contemplated of practicing the invention. In these examples the parts are by weight and the reduced viscosity, used as a measure of the degree of polymerization, was determined as indicated with reference to Equation VI.

*Example 1*

A salt from 6,6'-(hexamethylenedisulfonyl)dicaproic acid and hexamethylenediamine was prepared by the following procedure: To a paste of 100 parts of acid and 200 parts water, the stoichiometric amount of diamine was added under agitation. The hot solution showed a pH of 7.95 after all acid was dissolved in form of the salt. The solution was filtered and 800 parts of ethanol were added to precipitate the salt. Hexamethylenediammonium 6,6'-(hexamethylenedisulfonyl)dicaproate was obtained in 90.5% yield and excellent purity. It had a melting point of 186 to 188° C.

The salt of hexamethylenediamine and 6,6'-(hexamethylenedisulfonyl)dicaproic acid (88 parts) was charged to a stainless steel pressure autoclave which was flushed several times with high purity nitrogen and then sealed tightly. The reactor was then heated to 240 to 245° C. for 6.3 hours and the pressure which built up in the reactor was slowly released from time to time. After cooling, a resin was removed from the reactor and chipped into small granules.

The polyamide obtained had a reduced viscosity of 1.44, melted at 220 to 222° C., and was of light color. The resin was melt-spun by a plunger-type extrusion machine at 235° C. using a 30 hole 0.015" spinneret. The filaments formed were drawn over a hot-pin at 80° C. to an extent of 340% into strong 177 denier filaments. The following physical properties were obtained:

Tenacity, g.p.d. _____ 3.4
Elongation, percent _____ 13.7
Shrinkage, percent, at 100° C. _____ 14.0
Shrinkage, percent, at 150° C. _____ 12.0
Dye affinity, percent _____ 71.6

Dye affinity was measured in terms of percentage of dye in the dyebath that is absorbed by the fiber after 120 minutes' dyeing time at 100° C.

One of the most striking superior properties of the polyamide of this example as compared to the known polyamides is the greatly improved dye-affinity as compared, for example, with that of nylon-66 having a dye affinity of approximately 55%. The comparative dyeability studies were made with "Eastone Fast Red GLF," a dispersed acetate dye. Neither carriers nor swelling agents were employed in the dyeing process. The polyamide fibers of this example were also found to have excellent resilience.

Example 2

6,6'-(hexamethylenedisulfonyl)dicaproic acid (10 parts) and tetramethylenediamine (2.25 parts) were dispersed in ethanol (10 parts). This mixture was heated for eleven hours at 235° C. in nitrogen atmosphere. The polyamide obtained could readily be hand-drafted to form fibers from the melt. The melting point of the resin was 227 to 228° C., its reduced viscosity 0.86. The polymer can be used as molding resin, electrical insulator, etc.

Example 3

6,6'-(hexamethylenedisulfonyl)dicaproic acid (10 parts) and pentamethylenediamine (3 parts) were charged to a glass polymerization tube and heated under atmospheric pressure in nitrogen atmosphere to 228° C. for 4.8 hours. The resulting polyamide had a reduced viscosity of 0.96, and melted at 210 to 211° C. Fibers could be drawn from the melt.

Example 4

6,6'-(hexamethylenedisulfonyl)dicaproic acid (10 parts), heptamethylenediamine (2.94 parts), and water (10 parts) were placed in a polycondensation tube. The mixture was heated in nitrogen atmosphere at 235 to 240° C. for six hours while water slowly distilled out. The polyamide had a reduced viscosity of 1.5 and a melting point of 214 to 216° C. The bright polymer was extruded to strong, resilient fibers of excellent cold-drawability (500%) and outstanding dye-affinity. Films and foils can be produced from this resin.

Example 5

The salt (128 parts) of 6,6'-(hexamethylenedisulfonyl)-dicaproic acid and decamethylenediamine, prepared as described in Example 1 in high purity (melting point 190 to 191° C., pH 7.3), was heated at atmospheric pressure in a glass vessel for 3.2 hours with agitation in nitrogen atmosphere at 240 to 245° C. The resulting polymer was bright and had a reduced viscosity of 1.91. Its melting point was 223 to 225° C. The resin was chipped into small granules and melt-spun with a plunger type spinning machine at 250° C. Very strong filaments were obtained after a hot-stretching process, conducted at 80° C. The fibers were very easily dyeable to deep shades without the use of any carrier. Clear and tough films could also be obtained readily.

Example 6

A mixture of 6,6'-(hexamethylenedisulfonyl)dicaproic acid (10 parts), 1,4-bis(3-aminopropoxy)butane (4.62 parts), and water (10 parts) was heated for 5.3 hours at atmospheric pressure in nitrogen atmosphere at 190 to 230° C. An initially slow polymerization progressed satisfactorily in a later stage and led to a high molecular weight polyamide having a reduced viscosity of 1.02 which could be melt-extruded into white, strong and resilient filaments capable of being cold-drawn for more than 400%. The melting point of the resin was 200 to 201° C. The polymer can be used for injection molding, for the production of fibers and films, etc.

Example 7

6,6'-(hexamethylenedisulfonyl)dicaproic acid (10 parts) and meta-xylylenediamine (3.1 parts) were placed with 10 parts of water in a polycondensation tube with side-arm and heated between 225 and 240° C. for a period of 13.5 hours in nitrogen atmosphere. The polyamide obtained could be extruded into white fibers, which were cold-stretched 500%. The reduced viscosity of the resin was 0.56, its melting point 191 to 192° C. The resin can be used for wire coating, films, foils, fibers and other shaped articles.

Example 8

6,6'-(pentamethylenedisulfonyl)dicaproic acid (10 parts) and tetramethylenediamine (2.17 parts) were placed with some water in a glass-tube. This mixture was heated for 4.5 hours at 190 to 250° C. in nitrogen atmosphere at atmospheric pressure and water distilled out slowly. The polyamide obtained was fiber-forming and had a reduced viscosity of 0.69. The melting point of the polymer was 231 to 232° C.

Example 9

The salt (88 parts) of 6,6'-(pentamethylenedisulfonyl)-dicaproic acid and hexamethylenediamine, prepared in the manner described in Example 1 and obtained in excellent purity (melting point 197 to 199.5° C., pH 7.7) was heated at atmospheric pressure in a glass reactor for 7.5 hours in nitrogen atmosphere at 247 to 255° C. The resulting polyamide was fiber-forming and had a reduced viscosity of 1.07. Its melting point was 226 to 228° C. The resin was chipped into small granules and melt-spun with a plunger type spinning machine at 260° C. using a 30 hole 0.015" spinneret. The filaments were drawn over a hot-pin at 80° C. for 300% into strong 115 denier filaments.

A piece of tubing knitted from this material was dyed with "Eastone Fast GLF," a dispersed acetate dye, without using any carriers or dye-assistants. The fabric was dyed to a deep red shade, considerably deeper than obtainable under the same conditions with nylon-66 material.

The resin can also be used very suitably for wire coating, film, bristles, molding application, etc.

Example 10

6,6'-(pentamethylenedisulfonyl)dicaproic acid (10 parts), 1.7-heptanediamine (3 parts), and water (10 parts) were charged to a polycondensation vessel and heated for six hours at atmospheric pressure and in nitrogen atmosphere at 200 to 250° C. The polyamide obtained had a reduced viscosity of 1.74 and melted at 221 to 224° C. The resin has potential applicability as film, fiber, bristle, foil, molding resin, etc.

Example 11

6,6'-(pentamethylenedisulfonyl)dicaproic acid (10 parts), decamethylenediamine (4.02 parts), and 10 parts of water were heated in nitrogen atmosphere and under atmospheric pressure for six hours to 230 to 240° C. The high molecular weight polyamide obtained, having a reduced viscosity of 1.14, showed excellent fiber-forming properties. Melt-spun filaments showed greatly improved dye-absorption over other known polyamides containing no sulfone groups after they had been cold-stretched several hundred percent their original length. The melting point of the resin was 227 to 228° C. The resin can be used for the production of fibers, films, foils, and other shaped articles.

Example 12

6,6'-(pentamethylenedisulfonyl)dicaproic acid (10 parts), 1,4-bis(3-aminopropoxy)butane (4.7 parts), and 10 parts of water were heated in nitrogen atmosphere under atmospheric pressure for 9.4 hours at 225° C. until the melt had become highly viscous. After cooling, a tough white polyamide was obtained which could be melt-spun into fibers which were very strong after having been cold-stretched for approximately 600%. The reduced viscosity of the resin was 0.96, the melting point was 200 to 202° C.

Example 13

The salt (87 parts) of 6,6'-(pentamethylenedisulfonyl)-dicaproic acid and meta-xylylenediamine, prepared in the manner described in Example 1 and obtained in excellent purity (melting point 185 to 187° C., pH 7.2) was heated with agitation in nitrogen atmosphere at 220 to 225° C. The resulting polymer was white and had a reduced viscosity of 0.92. Its melting point was 211 to 213° C. The resin was melt-spun into strong, pliable, and resilient fibers of excellent dyeability. The polyamide shows also valuable properties when used as film or molding resin.

Example 14

6,6' - (decamethylenedisulfonyl)dicaproic acid (10 parts) and 1,4-butanediamine (1.77 parts) were charged to an 18" long polymerization tube. Some of the materials sticking to the wall were washed down with 10 cc. water. The mixture was allowed to stand overnight before it was heated to 245° C. for sixteen hours in nitrogen atmosphere at atmospheric pressure. The polyamide obtained was very tough and fibers could be hand-drafted readily from the melt. The melting point of the resin was 219 to 221° C., its reduced viscosity 0.96. The polymer can be used as a molding resin, fiber-former, electrical insulator, etc.

Example 15

6,6' - (decamethylenedisulfonyl)dicaproic acid (10 parts), 1,6-hexanediamine (3.242 parts), and ethanol (20 parts) were placed into an 18" long polymerization tube and heated under atmospheric pressure in nitrogen atmosphere to 230° C. for six hours, at 235° C. for 8.5 hours, and at 240° C. for 4.5 hours. The resulting polyamide had a reduced viscosity of 0.88 and melted at 209 to 210° C. Fibers drafted from the melt could be cold-drawn 500 to 600%.

Example 16

6,6' - (decamethylenedisulfonyl)dicaproic acid (10 parts) and 1,10-decanediamine (3.47 parts) were charged to a polycondensation tube. The mixture was heated in nitrogen atmosphere to 220° C. for 6.3 hours while water slowly distilled out. The polyamide obtained had a reduced viscosity of 1.04 and a melting point of 207 to 210° C. The white resin showed excellent fiber-forming properties and is believed also to be a useful material in molding and coating applications.

Example 17

6,6'-(3 - methylpentamethylenedisulfonyl)dicaproic acid (10 parts), 1,2-ethanediamine (1.43 parts), and water (5 parts) were heated in a polycondensation tube at atmospheric pressure in nitrogen atmosphere for six hours at 210° C. The resulting polyamide was very tough and exhibited fiber-forming properties. The polymer had a reduced viscosity of 0.80 and a melting point of 188 to 190° C. Filaments hand-drafted from the melt could be cold-drawn approximately 600%. The resin also has utility as a film-former.

Example 18

6,6' - (tetramethylenedisulfonyl)dicaproic acid (8.24 parts) and 1,10-decanediamine (3.61 parts) were charged to a polymerization tube and slowly heated under nitrogen to 255° C. The polymerization was carried out for 3½ hours between 255 and 270° C. under reduced pressure (about 2 mm.). The polyamide obtained had a reduced viscosity of 1.36 and melted at 243° C.

Example 19

A salt (48 parts) of 6,6'-(tetramethylenedisulfonyl)-dicaproic acid and 1,6-hexanediamine, prepared in the manner described in example 1 and obtained in excellent purity (melting point 196° C., pH 8.1), was dissolved in meta-cresol (200 parts). This solution was heated to reflux for 19.3 hours, the water formed during the polycondensation being azeotroped with the cresol. After cooling the solution to room temperature, a polyamide was precipitated with acetone, filtered, and washed several times with acetone, ethanol and ether. The resin obtained in powder form melted at 239° C. and had a reduced viscosity of 0.51.

Example 20

6,6' - (tetramethylenedisulfonyl)dicaproic acid (10 parts), and meta-xylylenediamine (3.32 parts) were heated for six hours at 240° C. at atmospheric pressure in nitrogen atmosphere. The polyamide obtained had a reduced viscosity of 0.68 and melted at 223° C. Filaments hand-drafted from the melted resin could be cold-drawn about 300%.

Example 21

4,4' - (tetramethylenedisulfonyl)dibutyric acid (10 parts) and meta-xylylenediamine (3.84 parts) were mixed in an 18" test tube equipped with a side-arm. Polymerization was conducted at 240° C. for 6.3 hours, high purity nitrogen being passed over the melt surface during the entire reaction.

A yellow-brown fiber-forming resin was obtained. It had a melting point of 224° C. and a reduced viscosity of 0.43.

Example 22

A salt (33 parts) of hexamethylenediamine and 4,4'-(tetramethylenedisulfonyl)dibutyric acid, prepared as described in Example 1, was refluxed twelve hours in meta-cresol (200 parts). The solution was then poured into acetone and a polymer was precipitated. The polymer was washed twice with hot acetone and refluxed three separate times for two hours duration in ethanol, then washed once in ethyl ether and dried.

The resulting resin had an ivory color, a melting point of 258° C. and a reduced viscosity of 0.40.

Example 23

4,4'-(tetramethylenedisulfonyl)dibutyric acid (10.00 pbw) and 3,6-dimethyl-1,8-octanediamine were mixed in an 18-inch test tube with side-arm. The tube sides were washed down with 5 grams distilled water. Polymerization was initially conducted at 220 to 230° C. in a nitrogen atmosphere for fifteen minutes. The temperature was then raised to 250 to 255° C. and the polymerization was continued for 1.25 hours.

The resin obtained had a melting point of 237° C. and a reduced viscosity of 0.49.

Example 24

The salt of 4,4'-(decamethylenedisulfonyl)dibutyric acid and 1,6-hexanediamine, prepared in the manner described in Example 1 and obtained in excellent purity (melting point 188° C., pH 7.9) was heated at atmospheric pressure in a glass reactor for one hour in nitrogen atmosphere at 250° C. The resulting polyamide was fiber-forming and had a reduced viscosity of 0.75. Its melting point was 236° C.

Example 25

The salt of 4,4' - (decamethylenedisulfonyl)dibutyric acid and 1,6-decanediamine, prepared in the manner described in Example 1 and obtained in excellent purity (melting point 190° C., pH 7.45), was heated at atmospheric pressure in a glass reactor for fifty minutes to 245° C. under an inert gas atmosphere. Heating was continued at 245° C. for one hour until fibers could be drafted from the melt. The resulting resin was fiber and film-forming and had a reduced viscosity of 1.29. Its melting point was 230 to 231° C.

It is to be expected that numerous modifications will readily become apparent to those skilled in the art upon reading this description. All such modifications are intended to be included within the scope of the invention as defined in the appended claims.

We claim:
1. A polyamide having a recurring molecular structure of the general formula

wherein the R's are divalent, unsubstituted polymethylene chains containing from three to six carbon atoms, the R' 's are divalent, saturated straight or branched chain alkylene groups containing from three to twelve carbon atoms, at least three carbon atoms being in the chain separating adjacent sulfonyl groups, and R" stands for a member selected from the group consisting of divalent saturated alkylene, alkylene ether and aralkylene groups, said polyamide having a reduced viscosity, measured at 30° C. with a concentration of 0.2 gram polyamide dissolved in 100 cc. of a 3:2 mixture of phenol and tetrachloroethane, between about 0.4 and 2.5.

2. A polyamide as defined in claim 1 wherein the R's are pentamethylene radicals.

3. A polyamide as defined in claim 1 wherein the R's are trimethylene radicals.

4. A polyamide as defined in claim 1 wherein R' is a polymethylene radical.

5. A polyamide as defined in claim 1 wherein R' is a tetramethylene radical.

6. A polyamide as defined in claim 1 wherein R' is a pentamethylene radical.

7. A polyamide as defined in claim 1 wherein R' is a hexamethylene radical.

8. A polyamide as defined in claim 1 wherein R' is a decamethylene radical.

9. A polyamide as defined in claim 1 wherein R' is a branched chain alkylene radical.

10. A polyamide as defined in claim 1 wherein R' is a 3-methylpentamethylene radical.

11. A polyamide as defined in claim 1 wherein R" is a divalent polymethylene radical.

12. A polyamide as defined in claim 1 wherein R" is an ethylene radical.

13. A polyamide as defined in claim 1 wherein R" is a tetramethylene radical.

14. A polyamide as defined in claim 1 wherein R" is a pentamethylene radical.

15. A polyamide as defined in claim 1 wherein R" is a hexamethylene radical.

16. A polyamide as defined in claim 1 wherein R" is a heptamethylene radical.

17. A polyamide as defined in claim 1 wherein R" is a decamethylene radical.

18. A polyamide as defined in claim 1 wherein R" is a branched chain alkylene radical.

19. A polyamide as defined in claim 1 wherein R" is a 3,6-dimethyloctamethylene radical.

20. A polyamide as defined in claim 1 wherein R" is an alkylene ether radical containing up to eighteen carbon atoms.

21. A polyamide as defined in claim 1 wherein R" is a 1,4-bis(propoxy)butane radical.

22. A polyamide as defined in claim 1 wherein R" is a xylylene radical.

23. A polyamide as defined in claim 1 wherein R" is a meta-xylylene radical.

24. A salt of an alpha,omega diamine selected from the group consisting of alkylene-, alkylene ether- and aralkylene diamines with a disulfonyl dicarboxylic acid having the general formula

in which the R's are divalent, unsubstituted polymethylene chains containing from three to six carbon atoms and the R' 's are divalent, saturated straight or branched chain alkylene groups containing from three to twelve carbon atoms, at least three carbon atoms being in the chain separating adjacent sulfonyl groups.

25. Hexamethylenediammonium 6,6'-(hexamethylenedisulfonyl)dicaproate.

26. Decamethylenediammonium 6,6'-(hexamethylenedisulfonyl)dicaproate.

27. Hexamethylenediammonium 6,6'-(pentamethylenedisulfonyl)dicaproate.

28. Hexamethylenediammonium 6,6'-(tetramethylenedisulfonyl)dicaproate.

29. Meta-xylylenediammonium 6,6'-(pentamethylenedisulfonyl)dicaproate.

References Cited in the file of this patent
UNITED STATES PATENTS

| | | |
|---|---|---|
| 2,571,251 | Jones | Oct. 16, 1951 |
| 2,969,387 | Horn et al. | Jan. 24, 1961 |
| 2,970,167 | Hostettler et al. | Jan. 31, 1961 |